(12) United States Patent
Weill

(10) Patent No.: US 9,843,613 B2
(45) Date of Patent: Dec. 12, 2017

(54) SYNCHRONIZATION OF MULTIMEDIA CONTENTS ON SECOND SCREEN

(71) Applicant: VISIWARE, Sevres (FR)

(72) Inventor: Laurant Weill, Bievres (FR)

(73) Assignee: VISIWARE, Sevres (FR)

( * ) Notice: Subject to any disclaimer, the term of this patent is extended or adjusted under 35 U.S.C. 154(b) by 486 days.

(21) Appl. No.: 14/282,344

(22) Filed: May 20, 2014

(65) Prior Publication Data

US 2014/0359079 A1    Dec. 4, 2014

(30) Foreign Application Priority Data

Jun. 4, 2013   (FR) ...................... 13 55101

(51) Int. Cl.
| | |
|---|---|
| G06F 15/16 | (2006.01) |
| H04L 29/06 | (2006.01) |
| H04N 21/41 | (2011.01) |
| H04N 21/439 | (2011.01) |
| H04N 21/462 | (2011.01) |
| H04N 21/81 | (2011.01) |

(52) U.S. Cl.
CPC ..... H04L 65/4076 (2013.01); H04N 21/4126 (2013.01); H04N 21/4394 (2013.01); H04N 21/4622 (2013.01); H04N 21/8133 (2013.01)

(58) Field of Classification Search
CPC . G06F 17/30067; G06F 11/1658; H04N 5/04; H04N 5/06; H04N 21/8133; H04N 21/4622
USPC ....................................................... 709/217
See application file for complete search history.

(56) References Cited

U.S. PATENT DOCUMENTS

| | | | |
|---|---|---|---|
| 8,640,181 B1 * | 1/2014 | Inzerillo ............ | H04N 21/4307 348/500 |
| 2004/0044532 A1 * | 3/2004 | Karstens .............. | G11B 27/102 704/271 |
| 2007/0006275 A1 * | 1/2007 | Wright ............. | H04N 21/44204 725/133 |

(Continued)

FOREIGN PATENT DOCUMENTS

| | | | | |
|---|---|---|---|---|
| EP | 2479984 | | 7/2012 | |
| FR | EP 2479984 A1 * | 7/2012 | ............. | H04N 5/607 |

OTHER PUBLICATIONS

Search Report dated 2013.

*Primary Examiner* — Aftab N. Khan
(74) *Attorney, Agent, or Firm* — Ipsilon USA, LLP

(57) ABSTRACT

The present arrangement relates to a display a screen of a second device of an enriched content previously pushed by a computer server, in synchronism with the display of the content of a broadcast program reproduced by a first device. The method includes, the server pushing an item of information representative of the start ($T_{REF}$) of the broadcasting of the program, then charged to the mobile device, via the execution of a specific software application, to begin listening to the audio band reproduced by the first device, to identify the program, by comparison with the audio signature received previously, to determine the instant ($T_C$) of actual reproduction of the program by the first device, and to thus deduce therefrom the elapsed lag which must be taken into account so as to display the enriched content in a synchronized manner.

7 Claims, 2 Drawing Sheets

(56) References Cited

U.S. PATENT DOCUMENTS

| | | | |
|---|---|---|---|
| 2007/0124756 A1* | 5/2007 | Covell | G06F 17/30743 |
| | | | 725/18 |
| 2011/0103763 A1* | 5/2011 | Tse | H04N 5/44543 |
| | | | 386/201 |
| 2011/0313849 A1* | 12/2011 | Brueck | G06Q 30/0201 |
| | | | 705/14.45 |
| 2013/0091518 A1 | 4/2013 | Trainor | |
| 2013/0111514 A1* | 5/2013 | Slavin | H04H 60/64 |
| | | | 725/18 |

* cited by examiner

SYNCHRONIZATION OF MULTIMEDIA CONTENTS ON SECOND SCREEN

RELATED APPLICATION

This application claims the benefit of priority from French Patent Application No. 13 55101, filed on Jun. 4, 2013, the entirety of which is incorporated by reference.

BACKGROUND

Field of the Invention

The present invention relates generally to the field of interactive multimedia broadcasting, and more particularly so the automatic detection and synchronization of a multimedia content broadcast and then reproduced on a first device, for example a television, so as to allow the display of an enriched content on a second screen with which a digital tablet, a telephone or a fixed or portable PC is equipped.

Description of Related Art

Starting from the observation that a significant and growing percentage of viewers consults the screen of their portable device or their computer (hereinafter referred to as "second screen" and "second device") while watching a program broadcast on their main television, numerous applications to be loaded and executed on the second device for display on the second screen are today developed so as to make it possible to enrich the information relating to the program broadcast and to offer viewers ample possibilities of interaction with the program.

By way of nonlimiting example, during a televised game show broadcast on a channel, the viewer can display on his second screen the same questions as those which are posed to the participants, answer them, compare his scores, dispatch real-time comments, or any other action which truly gives the user the impression of participating in the transmission.

Applications of this type are also of interest to advertisers who see an opportunity to provide more information relating to a product forming the subject of a television commercial break.

From the user's point of view, these experiences, also called "second-screen. experiences", rely on the use of a system architecture making it possible to feed the second screen (or companion screen) with the enriched contents during the broadcasting of a program.

The Applicant has in particular developed the PLAYALONG (registered trademark) system, the architecture of which hinges around three main parts:

- at the level of the "back office" (term used to indicate the components and applications of the Internet which are not visible to the end user), a CMS tool (the initials standing for Content Management System) which will essentially prepare, format and store all the enriched contents that it is desired to dispatch, and decide the instants at which these enriched contents must be dispatched;
- the PLAYALONG platform proper, comprising a plurality of servers hosted in a computing cloud so as to recover the enriched contents dispatched by the CMS tool, and whose role is to redeploy these contents to a large number of connected mobile devices for display on their screen.
- The client applications loaded and executed on the end users' mobile devices so as to receive the enriched contents dispatched by the platform and display them on the screen associated with these devices.

The PLAYALONG platform uses, in particular, push servers to make it possible to push the contents (example: quiz, survey, video, image, score table) to the mobile devices without the latter having to ask for them.

It is readily understood that certain enriched contents must appear in a manner perfectly synchronized with the main multimedia content displayed on the first screen. A defect of synchronization would indeed have a negative impact on the second-screen experience.

Now, at the so-called reference instant at which a program with a multimedia content to which it is desired to append an enriched content is actually broadcast, a highly variable lag may elapse before this multimedia content is actually displayed on the first screen, this lag being dependent on the broadcasting network making it possible to reach the main television. Thus, a user whose television receives a multimedia program via digital terrestrial television will not view the images of this same multimedia program at the same time as a user whose television is connected via an Internet box or else via a satellite network. The offsets between networks can be fairly significant; up to as much as 20 seconds.

Synchronization solutions using the recognition, by the mobile device fitted with the second screen, of the sound which passes on the main device have already been proposed. These solutions using this principle of ACR (the initials standing for Audio Content Recognition) are of two types:

A first technique, known as "Watermarking", consists in periodically injecting, into the audio band of the televised program to be broadcast, a particular audio signal (or mark) physiologically inaudible to the human ear, comprising the reference instant, that is to say the instant of transmission of the broadcast image. When the audio band is reproduced by the loudspeakers of the main device, for example the television, a specific application loaded and executed by the second device will also listen to this audio band, in particular via the microphone integrated into the mobile device, recognize the hidden marks and extract therefrom the reference instant. The second device, which comprises its own internal clock, will then be able to determine the temporal offset between the reference instant and the instant at which the corresponding program is actually reproduced on the television, and use this temporal offset to determine the precise instants at which enriched contents must be displayed on the second screen. In the case of live transmissions, this "Watermarking" technique is very constraining for the production facilities of television channels which must be equipped with the appropriate hardware making it possible to inject the hidden audio marks in real time. Furthermore, the bandwidth used for these marks is low, thus precluding the transport of a great deal of information.

According to another technique, known as "Fingerprinting", and described in particular in document WO 2013/040533 A1, a specific application loaded and executed on the second device will allow it so listen, via its integrated microphone, to the audio band reproduced by the loudspeakers of the main device, and to tap off audio samples that it will transmit to a remote platform, typically an Internet server. For its part, the remote platform listens to and stores permanently all the programs such as broadcast on all the channels. When it receives an audio sample tapped off by the second device, the platform is therefore able to compare this sample with the programs listened to, and if it finds it, to calculate the temporal offset that it will be able to transmit in return so the second device. The "Fingerprinting" solution is less constraining for the broadcasters of multimedia programs since no signal needs to be injected into the broadcast audio/video signal. Nonetheless, the devices on the server platform side for listening to the programs and responding to significant loadings from users are expensive. Likewise, the processing times at the level of the platform in order to be able to perform the comparisons of all the samples received with the set of programs listened to can be significant, so that there is a risk of the second device not receiving on time the item of information regarding the temporal offset that it must apply to control the display of certain enriched contents on the second screen, or reacting too late.

OBJECTS AND SUMMARY

A need therefore exists for a solution allowing very precise synchronization of the display of enriched contents on a second screen with respect to the display on the main screen of the broadcast program.

The present invention makes it possible to respond to this need by proposing a method of automatic synchronization between the reproduction by a first device of a multimedia content included in a broadcast program and the display of an enriched content associated with the multimedia content on a screen of a second device able to be connected to a communication network, said enriched content being transmitted automatically to the second device by at least one computer server of said communication network, the method comprising:

a step, prior to the reproduction of the multimedia content by the first device, during which at least one audio signature representative of the program or of the multimedia content broadcast is generated and stored in a database linked to said computer server, said audio signature being transmitted automatically for storage to the second device by said computer server; and in the course of the broadcasting of the program by a remote source, the broadcast program being received and reproduced by the first device:

a step of detection by the second device of an audio signal generated by the first device during the reproduction of the broadcast program, and of identifying the instant of reproduction by comparing the audio signal detected with the audio signature stored;

a step of determining a synchronization lag after which the enriched content must be displayed on the screen of the second device, the method being characterized in that it furthermore comprises a step of automatic transmission, by said at least one computer server destined for the second device via the communication network, of an item of information representative of a reference instant corresponding to the instant at which the program or the multimedia content is actually broadcast by the remote source;

in that the reception of said item of information representative of a reference instant by the second device triggers said detection step, and in that the synchronization lag is determined as a function only of the reference instant and of the instant of reproduction identified.

Stated otherwise, in addition to pushing an enriched content, the computer server (for example the PLAYALONG platform) is used here to push in advance, on the second device, audio signatures of the broadcast program, and to mash the item of information representative of the start of the broadcasting of the program or of the multimedia content to be listened to with the reference of the program. The second device will then begin to listen to the audio band reproduced by the first device, to identify the broadcast program or at least the multimedia content to be enriched, by comparison, locally, with the audio signatures previously received, the instant of actual reproduction on the first device, and thus deduce therefrom the elapsed lag which must be taken into account so as to display the enriched content in a synchronized manner. The various items of information are preferably pushed to the second device (so-called "push" technique). As a variant, they could be dispatched on request from the second device (so-called "pull" technique).

According to additional optional characteristics:

said item of information representative of the reference instant is generated by a content-manager module and transmitted to the computer server via the communication network;

the enriched content is generated by an enriched contents-generator module, and stored in the database before transmission to the second device;

the broadcast program is a radio program, or a televised program. More generally, the broadcast program can be audiovisual (TV, cinema, Internet etc.) or just audio (radio stations, telephones etc.);

the first device can be a television, a computer, an intelligent telephone, a games console, or any electronic device able to reproduce at least the sound of the broadcast program received;

the second device can be a digital tablet, an intelligent, telephone, a fixed or portable computer, or any device comprising a microphone, a display screen, and means of connection to the Internet network.

The subject of the invention is also a computer server for the implementation of the synchronization method, characterized in that it is able to automatically transmit to the second device, via the communication network:

the audio signature representative of the program. or of the multimedia content telebroadcast;

the item of information representative of the reference instant corresponding to the instant at which the program or the multimedia content is actually broadcast by the remote source; and the enriched content to be displayed by the second device.

The subject of the invention is moreover a software application able to be loaded and executed on a device comprising a microphone, a display screen and means of connection to the communication network, for the implementation of the synchronization method, characterized in that it comprises:

program code instructions able to control the device so that it connects to the computer server via the communication network, so as to automatically receive on the one hand, the audio signature representative of the program or of the multimedia content telebroadcast for storage, and on the other hand, the reference instant corresponding to the instant at which the program or the multimedia content is actually broadcast by the remote source;

program code instructions able to control the device, on receipt of the reference instant, so that it detects, via the microphone, an audio signal generated by the first device during the reproduction of the broadcast program, and identifies the instant of reproduction by comparing the audio signal detected with the audio signature stored;

program code instructions able to control the display of the enriched content on the display screen after a synchronization lag determined on the basis only of the reference instant and of the instant of reproduction identified.

BRIEF DESCRIPTION OF THE DRAWINGS

The invention and the advantages that it affords will be better understood in view of the following description given with reference to the appended figures, in which.

DETAILED DESCRIPTION

In the description which follows, it is considered, by way of nonlimiting example, that the broadcast program comprising at least one multimedia content, with which it is desired to associate at least one enriched content to be displayed on a mobile device, is a televised program, consequently comprising images and sounds. As will be more apparent subsequently, the invention is also applicable in respect of audio-only programs, such as a transmission on radio waves.

Figure 1:
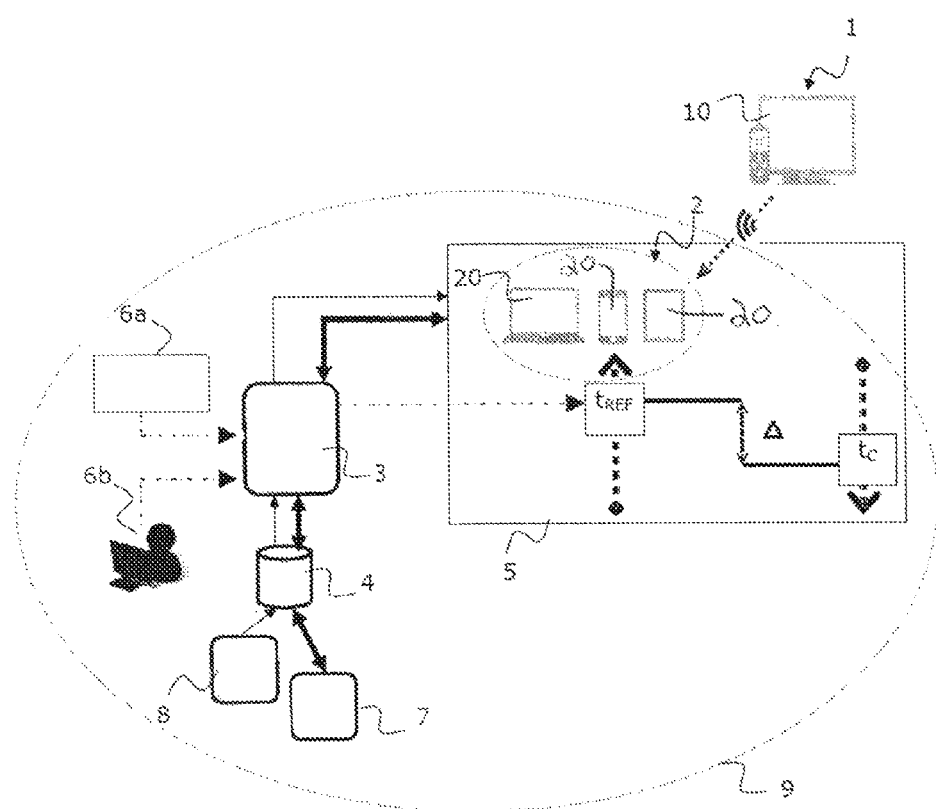
FIG. 1 schematically illustrates an exemplary communication infrastructure making it possible to implement the invention.

A first device 1 able to receive and reproduce the broadcast program has been represented with reference to FIG. 1. In the case of a televised program, the first device 1 is therefore typically a television, but can consist of any known device able to reproduce the sound and the image of the televised program respectively on loudspeakers (not represented) and a screen 10 (fixed or portable computer, intelligent telephone, games console etc).

The way in which the program is actually broadcast by a remote source and then received by the first device 1 has not been represented in the figure since it does not present any particular interest, except that already indicated in the introduction of inducing a transmission lag between the instant at which the broadcasting of the program starts (reference instant $t_{REF}$) and the instant at which the reproduction of this program starts on the first device 1 (instant of reproduction $t_C$), this transmission lag being variable according to the broadcasting network used (digital terrestrial television, satellite, IP etc.).

The system architecture which will allow the viewer to live a "second screen" experience essentially comprises:
  a second device 2 held by the viewer and integrating the second screen 20;
  at least one platform for push by computer servers 3;
  a database 4 linked to the platform;
  a specific software application 5 able to be loaded and executed on the second mobile device 2;
  and, at the level of the "back-office" part:
  a content-manager module 6a making it possible in particular to manage and push on the platform the item of information indicating the start of the broadcasting of the program to be listened to with the reference of the program;
  an enriched-contents generator module 7 connected to the database 4;
  an audio-signatures generator module 8 connected to the database 4.

These various hardware components are able to communicate with one another via a communication network 9, typically the Internet network. The specific software application 5 comprises various parts of program code instructions executed by the second device 2 with the aim of allowing the second-screen experience.

The second device 2 is for example a digital tablet, a laptop computer, an intelligent telephone, or more generally any portable or fixed device comprising a microphone, a display screen and means of connection to the communication network.

Figure 2:
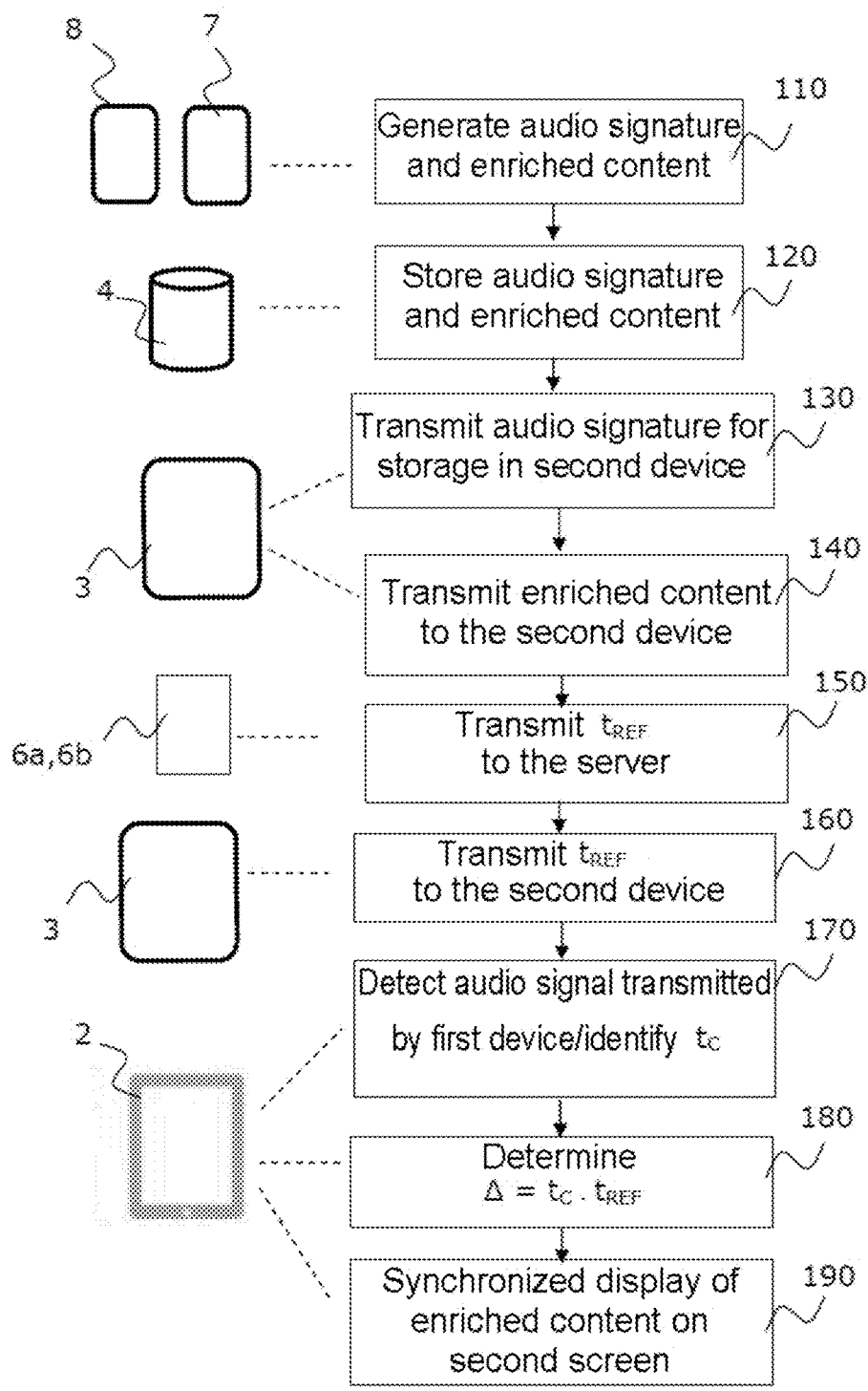
FIG. 2 represents a series of steps that may be implemented in a synchronization method in accordance with the invention.

A synchronization method 100 in accordance with the invention and using the system architecture defined hereinabove will now be described with reference to FIG. 2. To facilitate understanding, the hardware components of the architecture of FIG. 1 concerned in each step have been represented on the left of FIG. 2, opposite the various steps. The steps have been shown in a certain order. Nonetheless, it will be understood during the reading which follows that the order of certain steps can be modified without departing from the scope of the present invention.

The synchronization method 100 comprises a series of steps (steps 110 to 140) which can occur at any moment anterior or posterior to the reference instant $t_{REF}$ at which the program is broadcast, but prior to the instant $t_C$ at which the multimedia content that it is desired. to enrich will actually be reproduced on the first device 1. A first step 110 comprises the generation of one or more audio signatures representative of the broadcast program concerned. This step 110 consists in producing a signature characteristic of the sound, sufficiently compressed to be transportable easily and rapidly (weight of the signature), but sufficiently detailed to define in a one-to-one manner the sensed sound. On a sound lasting several hours, it is samples rather than the entirety of the sound that are processed. The generation of the signature (or ADN) of the sound uses Fourier transform processing as its basic principle.

These signatures are generated by the audio-signatures generator module 8.

Moreover, the enriched content that it is desired to associate with the program. for display on the second screen 20 is generated by the contents-manager module 7.

The enriched content and the audio signatures are thereafter transmitted to the database 4 for storage (step 120). it should be noted that, although the generation of the enriched content and of the audio signature has been represented as carried out in a single step 110, these operations are independent. and can be carried out in a non-concomitant manner. The same goes for the transmission step 120.

The audio signature is thereafter transmitted by the computer server 3 to the second device 2 during step 130. This transmission is preferably effected according to the "push" technique. FIG. 1 illustrates by slender and continuous lines the route of an audio signature from the audio-signature generator module 8 to the second device 2.

Moreover, the computer server 3 transmits the enriched content to the second device 2. This step, reference 140 in FIG. 2, is here considered. to be posterior to the transmission of the audio signature, but may in fact take place at any moment before the instant $t_C$. FIG. 1 illustrates by thick and continuous lines the route of an enriched content from the enriched-contents generator module 7 to the second device 2.

Subsequently, in the course of the broadcasting of the program by the remote source, the broadcast program will be received and reproduced by the first device 1. In particular, the sound band associated with this program will be played by the loudspeakers of this device 1. During a step 160, the server 3 will automatically transmit an item of information representative of the reference instant $t_{REF}$ to the second device 2 Accordingly, the module 6a is able to listen to all the sources that are broadcasting programs, and so recognize the program by identifying its previously stored audio signature (step 150). As a variant, a human operator 6b (see FIG. 1) can originate the transmission of this item of information. FIG. 1 illustrates by broken lines the route of an item of information representative of the reference instant $t_{REF}$ from the content-manager module 6 to the second device 2. In both cases, the item of information transmitted furthermore advantageously comprises an identifier associated with the audio signature, a table of program start and end times, as well as the enriched content or by default, a link to this enriched content that it will be appropriate to display on the second screen.

On receipt of this item of information, the software application 5 executed by the second device 2 will control the latter in such a way that it listens, via its integrated microphone, to the audio signal generated by the first device 1 during the reproduction of the broadcast program. The second device 2 will thus, by comparison with what it listens to and the audio signature previously received (step 130), identify the program broadcast and the instant of reproduction $t_C$ on the first device (step 170).

On the basis of the knowledge of these two values $t_{REF}$ and $t_C$, the second device 2 is then able to determine the duration which has elapsed between the instant of start of broadcasting of the program and the instant of actual reception by the first device, which corresponds to the lag Δ that it must apply before commanding the display on its screen 20 of the enriched content which is pushed to it so as to be synchronous with the first screen (steps 180 and 190).

Although the method compliant with the invention has been described only with reference to a "second screen" experience with respect to a televised program, it is understood that the invention finds applications provided that the broadcast program is audio. Consequently, enriched content can be provided as a supplement to any audiovisual program (television, cinema, Internet etc.), or to any audio program (radio waves, telephone, etc.).

Moreover, it should be noted that the platform 3 can be composed of several servers hosted in a computing cloud. Likewise, several databases 4 can be used to store the enriched contents and/or the audio signatures.

The solution proposed by the invention is at least as advantageous as the known technique of "Fingerprinting" with respect to "Watermarking", in particular because no signal need be injected into the broadcast signal, and because the solution offers a good bandwidth.

The solution of the invention is nonetheless optimized with respect to "Fingerprinting" in terms of processing time: it does not require any large quantities of servers, bandwidth, or connections to the television channel broadcasting networks (in this precise case) which must be monitored to effect all-azimuth recognition of sounds. Moreover, the consumption of the batteries of all the second devices is reduced since it is the information representative of $T_{REF}$ which informs the second screen to begin and to finish listening (use of the microphone and of the audio circuits) instead of listening continuously.

In the foregoing, it has been assumed that the reference instant $t_{REF}$ pushed forward by the computer server corresponded to the instant at which the program was actually broadcast by the remote source. Of course, without departing from the scope of the present invention, this reference instant can also correspond to the instant at which the multimedia content to be enriched is actually broadcast by the remote source, thereby making it possible to reduce still more the duration for which the microphone is listening and right from the first occurrence of expected audio signature to establish the synchronization between the first and the second screen. In particular, if it is desired to enrich three multimedia contents, typically three commercial breaks, included in one and the same program, the computer server will be able to push forward three reference instants making it possible each time to calculate the synchronization lag on the basis of which the enriched content must be displayed. As a supplement to the reference instant associated with the broadcasting of each multimedia content to be enriched, provision may be made to also dispatch an end instant so as to define a time interval during which the microphone will be active.

Finally, as the enriched content has been transmitted to the second device even before the instant $T_C$ at which the multimedia content that it is desired to enrich is actually reproduced by the first device, this enriched content is displayed instantaneously perfectly synchronized with the first screen, on the second screen.

The invention claimed is:

1. A method of automatic synchronization between the reproduction, by a first device, of a multimedia content included in a broadcast program, and the display of an enriched content, associated with the multimedia content, on a screen of a second device able to be connected to a communication network, said method comprising the steps of:

automatically transmitting said enriched content to the second device by at least one computer server of said communication network, the method further comprising the steps of:

prior to the reproduction of the multimedia content by the first device, during which at least one audio signature representative of the program or of the multimedia content broadcast is generated and stored in a database linked to said computer server, said audio signature is transmitted automatically for storage to the second device by said computer server, wherein in the course of the broadcasting of the program by a remote source, the broadcast program is received and reproduced by the first device:

detecting, by the second device, an audio signal generated by the first device during the reproduction of the broadcast program, Identifying the instant of reproduction ($t_C$) by comparing the audio signal detected with the audio signature stored;

determining a synchronization lag at the second device after which the enriched content must be displayed on the screen of the second device, wherein said determination of said synchronization lag includes automatic transmission, by said at least one computer server destined for the second device via the communication network, an item of information representative of a reference instant ($t_{REF}$) corresponding to the instant at which the program or the multimedia content is actually broadcast by the remote source; where the reception of said item of information representative of a reference instant ($t_{REF}$) by the second device triggers said detection step, such that the synchronization lag is determined as a function only of the reference instant ($t_{REF}$) and of the instant of reproduction ($t_C$) identified, and wherein the method further includes displaying the enriched content on the screen of the second device in synchronization with the playing of the multimedia content.

2. The method according to claim 1, wherein said item of information representative of the reference instant ($t_{REF}$) is generated by a content-manager module and transmitted to the computer server via the communication network.

3. The method according to claim 1, wherein the enriched content is generated by an enriched contents-generator module, and stored in the database before transmission to the second device.

4. The method according to claim 1, wherein the broadcast program is a radio program.

5. The method according to claim 1, wherein the broadcast program is a televised program.

6. The method according to claim 1, wherein the first device is selected from the group consisting of a television, a computer, an intelligent telephone, a games console, and any electronic device able to reproduce at least the sound of the broadcast program received.

7. The method according to claim 1, wherein the second device is selected from the group consisting of a digital tablet, an intelligent telephone, a fixed or portable computer, and any device comprising a microphone, a display screen, and means of connection to the Internet network.

* * * * *